United States Patent
Koskelainen et al.

(10) Patent No.: US 7,107,017 B2
(45) Date of Patent: Sep. 12, 2006

(54) SYSTEM AND METHOD FOR PROVIDING SUPPORT SERVICES IN PUSH TO TALK COMMUNICATION PLATFORMS

(75) Inventors: Petri Koskelainen, Tampere (FI); Mikko Vainikainen, Tampere (FI)

(73) Assignee: Nokia Corporation, Espoo (FI)

( * ) Notice: Subject to any disclaimer, the term of this patent is extended or adjusted under 35 U.S.C. 154(b) by 135 days.

(21) Appl. No.: 10/431,626

(22) Filed: May 7, 2003

(65) Prior Publication Data

US 2004/0224710 A1    Nov. 11, 2004

(51) Int. Cl.
*H04B 1/38* (2006.01)
(52) U.S. Cl. ..................... 455/90.2; 370/357
(58) Field of Classification Search ............... 455/413, 455/90.2, 412.1, 416, 518, 410; 709/227; 370/352, 357, 355
See application file for complete search history.

(56) References Cited

U.S. PATENT DOCUMENTS 6,426,956 B1  7/2002  Eteminan

| 2003/0149774 | A1* | 8/2003 | McConnell et al. | 709/227 |
|---|---|---|---|---|
| 2004/0009761 | A1* | 1/2004 | Money et al. | 455/406 |
| 2004/0047303 | A1* | 3/2004 | Fernandez et al. | 370/293 |
| 2004/0196826 | A1* | 10/2004 | Bao et al. | 370/352 |
| 2004/0249949 | A1* | 12/2004 | Gourraud et al. | 709/227 |

OTHER PUBLICATIONS

Nokia Press Releases, "Ericsson, Nokia and Siemens join forces to promote unified solution for push to talk over GPRS and EDGE networks", Feb. 17, 2003.
"Push to Talk over Cellular (PcC)", http://www.nokia.com/nokia/0.5184.5764.00.html.

* cited by examiner

*Primary Examiner*—Edward F. Urban
*Assistant Examiner*—Tu Nguyen
(74) *Attorney, Agent, or Firm*—Hollingsworth & Funk, LLC (57) ABSTRACT

A system, apparatus, and method for introducing services into a Push to Talk (PTT) environment. Requests for services are generated and transmitted via requesting PTT clients. The request is received at a PTT server, which forwards the request to a PTT application server recognized by the PTT server as another PTT client. The requested service is performed at the PTT application server, and a result is generated in response. The result is transmitted from the PTT application server to the requesting PTT client by way of the PTT server.

35 Claims, 7 Drawing Sheets

SYSTEM AND METHOD FOR PROVIDING SUPPORT SERVICES IN PUSH TO TALK COMMUNICATION PLATFORMS

FIELD OF THE INVENTION

This invention relates in general to communications, and more particularly to a system, apparatus, and method for providing auxiliary services in Push to Talk communication environments.

BACKGROUND OF THE INVENTION

Advances in communication infrastructures and protocols have turned standard computing devices into valuable communication tools. Computers communicate with each other, and with other electronic devices, over networks ranging from Local Area Networks (LANs) to wide reaching Global Area Networks (GANs) such as the Internet. Other electronic devices have experienced similar transformations, such as mobile phones, Personal Digital Assistants (PDAs), and the like. Today, these wireless devices are being used for a variety of different types of communication. For example, current and anticipated mobile phone technologies have transformed these wireless devices into powerful communication tools capable of communicating voice, data, images, video, and other multimedia content. Mobile phones, at one time solely a mobile voice communication tool, now often include network communication capabilities such as e-mail, Internet access, etc. With the integration of wireless and landline network infrastructures, a multitude of new services are arising, and various information types can be conveniently communicated between wireless and/or landline terminals.

One such new service is the "Push to Talk" (PTT) service, also commonly referred to as the "Push to Talk over Cellular" (PoC). The PTT service provides a direct one-to-one and one-to-many voice communication service in mobile networks. It is considered to have an "always on" connection, where half-duplex communication can be initiated to both individuals and talk groups simply with the push of a button on the PTT client device. To the user, operation is similar to the traditional "walkie talkie," but clearly more powerful in the ability to designate and select individual recipients and group recipients of the communication. And, by using cellular access and radio resources, PTT communications has a virtually global reach.

Call connection with PTT service is almost instantaneous. One-way communications are initiated by a user, while the designated recipient(s) listens at the other end. PTT calls are generally connected without the recipient(s) answering, and they are typically received through the built-in loudspeaker on the receiving device. PTT service uses cellular access and radio resources more efficiently than circuit-switched cellular services, as network resources are reserved only one-way for the duration of the talk "spurts" instead of two-way for an entire call session.

Notwithstanding all of the benefits of a PTT system, there are limitations. For example, its real-time, half-duplex speech communication inherently has limitations, such as the inability to carry out simultaneous two-way communication. Due largely to such inherent limitations, PTT systems are generally not expected to provide other services beyond its intended half-duplex voice communication.

However, PTT is a platform that may support other functions beyond just the spontaneous voice communication that it is intended for. For example, a PTT system may be a suitable platform for games or other such services. Unfortunately, current PTT platforms do not provide a way to support such services, as games or other services may require various supporting features that are not currently available in PTT systems.

Accordingly, there is a need in the communications industry for a manner of utilizing PTT systems for services beyond their traditional real-time speech communication, and to provide a manner of supporting such services by providing the various features required to make these services practical in PTT systems.

SUMMARY OF THE INVENTION

To overcome limitations in the prior art described above, and to overcome other limitations that will become apparent upon reading and understanding the present specification, the present invention discloses a system, apparatus and method for introducing services in Push to Talk (PTT) network environments.

In accordance with one embodiment of the invention, a method is provided for introducing services into a Push to Talk (PTT) environment. The method includes generating and transmitting a request for services via a requesting PTT client. The request is received at a PTT server, which forwards the request to a PTT application server recognized by the PTT server as another PTT client. The requested service is performed at the PTT application server, and a result is generated in response thereto. The result is transmitted from the PTT application server to the requesting PTT client by way of the PTT server.

In accordance with another embodiment of the invention, a method is provided for providing services in a Push to Talk (PTT) system where PTT clients can communicate with one another by way of a PTT server. The method includes receiving, at the PTT server, an over-the-air service request from a requesting PTT client. In this embodiment, the service request includes at least one service command to identify a corresponding service feature. The service request is forwarded to a PTT application server that communicates with the PTT server in the same manner that it would communicate with a PTT client. The service command is executed at the PTT application server to perform the corresponding service feature requested by the requesting PTT client.

In accordance with another embodiment of the invention, a server is provided for providing services to push to talk (PTT) clients via an intermediary PTT server. The server includes a processing system, and a database to store information targeted by service requests issued by the PTT clients. A PTT client module, operable via the processing system, communicates with the PTT server in a client-server relationship. At least one service module operable via the processing system is provided to process the service requests identifying the service module as a targeted service.

In accordance with yet another embodiment of the invention, a system is provided for providing services over a network via a Push to Talk over Cellular (PoC) platform. The system includes at least one push to talk (PTT) client device having PTT capabilities. The PTT client device is configured to generate and transmit at least one service request over-the-air (OTA). A PTT server is coupled OTA to the PTT client device to receive and redirect the service request to an addressed PTT client on the network. A PTT application server serving as the addressed PTT client is coupled to the network to receive the redirected service request, where the PTT application server includes a processing system to process the service request.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner of introducing application-supporting services in Push to Talk (PTT) network environments. As used herein, a Push to Talk (PTT) system generally refers to any non-full-duplex (e.g., half duplex) voice communication available over an otherwise two-way radio/cellular network. PTT can serve as a very good platform for many applications, such as games. Such applications, however, may require support features/services, such as voicemail, text message retrieval, statistical information retrieval, etc. The present invention provides a manner of making such services available to the PTT users via the network. In one embodiment, service requests are initiated by PTT clients to the PTT application server by way of the PTT server that manages the PTT communications. The PTT server, substantially treating the PTT application server as a PTT client, forwards the service request to the PTT application server. A command(s) embedded in (or otherwise provided with) the service request is processed by the PTT application server to perform the service requested by the PTT client. The result is provided back to the PTT server, again where the PTT application server appears to the PTT server as a PTT client, and the result is ultimately returned to the PTT client via the PTT server.

The support services may also initially collect information that is later supplied to a requesting PTT client. For example, where the support service provided is voicemail, the PTT application server can store a voicemail from a first PTT client for subsequent retrieval by another PTT client. Application data may also be accumulated and processed to provide, for example, statistical information. An example would be the "high scores" in a game application, where the PTT application maintains the highest score for a particular game. Other support services may be real-time services, such as retrieving the current time, calculating values (e.g., calculating the average score of certain participants of a game), etc. The ability to provide such support features facilitates the practical implementation of applications on the PTT platform.

Figure 1:
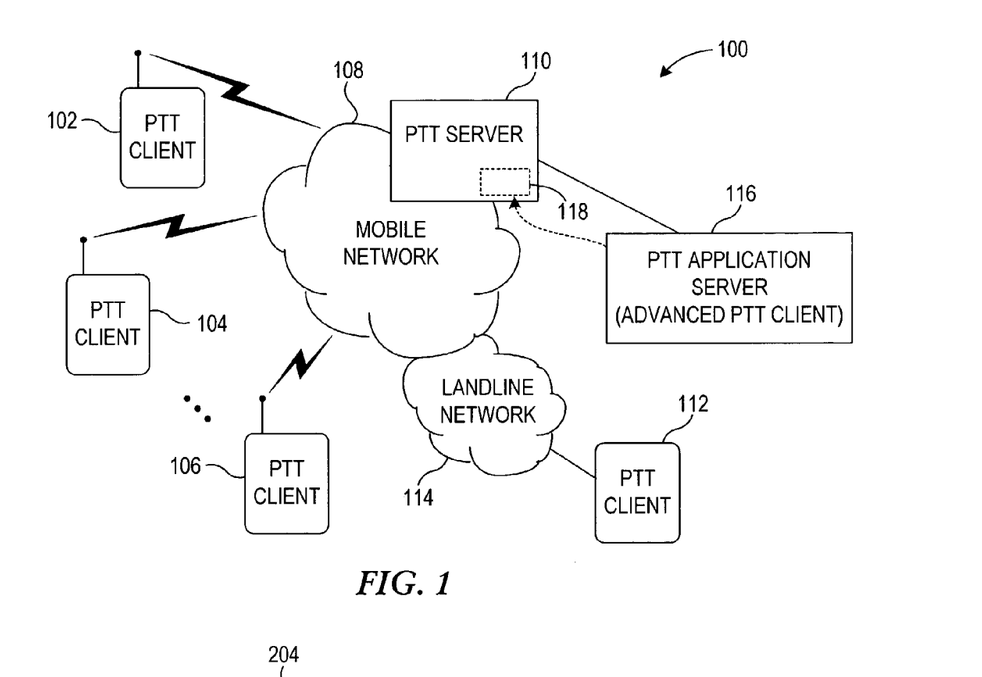
FIG. 1 is a block diagram illustrating a representative PTT application environment in accordance with the present invention.

The block diagram of FIG. 1 illustrates a representative PTT application environment 100 in accordance with the present invention. Any number of mobile PTT clients 102, 104, 106 may include PTT functionality, and communicate with other PTT clients or groups of PTT clients (hereinafter "talk groups") by way of the mobile network 108 and the PTT server 110. Generally, PTT facilitates direct one-to-one and one-to-many voice communication services in the mobile network. As seen by the user, PTT service functions similarly to "two-way radios," but is available through mobile phones, Personal Digital Assistants (PDAs), and other mobile devices over existing mobile networks such as, for example, GSM/GPRS, EDGE, and other analogous networks. Network resources are generally reserved only for the duration of the talk spurts instead of for the entire call session. The PTT service is implemented using the PTT servers, often in the IP Multimedia Subsystem (IMS) frame, where a PTT server 110 handles call set-up signaling, talk spurt reservation for one speaker at a time, real-time packet routing, etc. The PTT server 110 also provides interfaces to the operator's provisioning and network management systems, and can create charging detail records (CDRs) which can be used as the basis for billing. In operation, a user of a PTT client 102 just pushes a button to talk, which sends packet data traffic to the dedicated PTT server 110. In the case of a group call, the PTT server 110 duplicates the traffic to all recipients in a process referred to as multi-unicasting. Group creation and attachment control may be based on, for example, the Session Initiation Protocol (SIP), and voice traffic is generally carried out through a Real-Time Transport Protocol (RTP) streaming bearer. It should be noted that other PTT clients 112 may be implemented in a wired configuration such that they are coupled to the PTT server 110 via a landline network 114, or via both the landline network 114 and mobile network 108.

The PTT system 100 may serve as a great platform for new applications/services, such as games, which may require many new features not currently available in PTT systems. In accordance with the present invention, a PTT application server 116 is introduced into the network. The PTT application server 116 essentially operates as an "advanced" PTT client. In other words, the PTT application server 116 acts like a normal client vis-à-vis the PTT server 110. In this manner, service requests issued by the PTT clients 102, 104, 106, 112 can be handled by the PTT server 110 just as if the service request had been voice packets sent in connection with standard PTT talk spurts. By implementing a PTT application server 116 as an advanced PTT client, the PTT server 110 itself does not require modification upon introduction of services such as voicemail into the PTT system 100. PTT clients do not need to be updated either, since the application logic is at the application level, so new downloadable applications (e.g., Java applications) can use new features quickly using the current PTT infrastructure. On the other hand, the PTT application server 116 can be easily upgraded and new features can be added.

In one embodiment, the PTT application server 116 is implemented external to the PTT server 110—just as a typical PTT client would be. In another embodiment, the PTT application server 116 is a distinct network entity from the PTT server 110, yet is co-located with the PTT server 110 as illustrated by block 118. More particularly, the PTT application server 116 may be physically located integral or proximate to the PTT server 110. However, because the PTT server 110 and PTT application server 116 are configured in a client-server relationship such that the PTT application server 116 acts like a normal client towards the PTT server 110, the PTT application server 116 may be physically located at any point in the network. In yet another embodiment, the PTT application server 116 may be located at the PTT server 110 as shown by block 118, where a direct interface couples the PTT server 110 and PTT application server 116.

Figure 2:
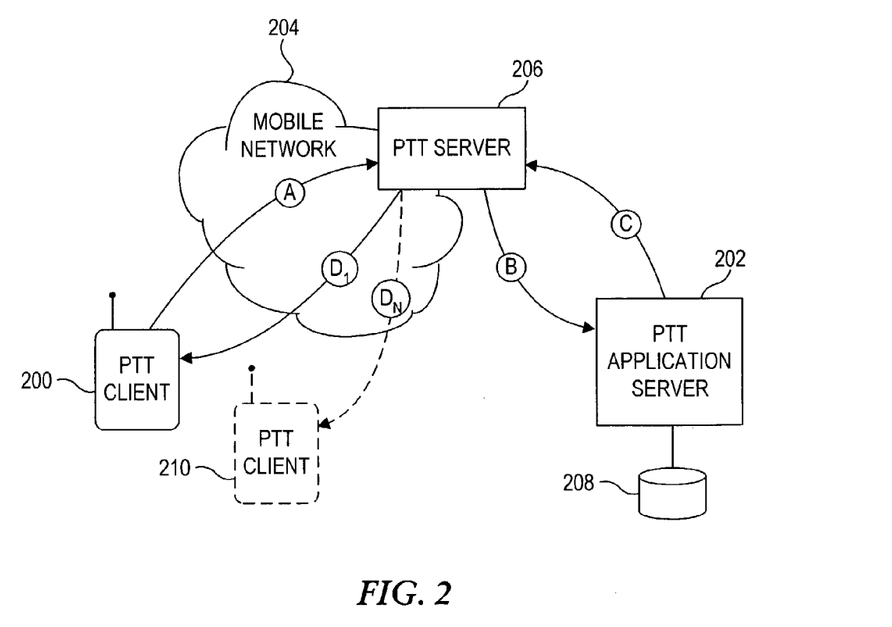
FIG. 2 is a block diagram illustrating a representative PTT service transaction in accordance with the principles of the present invention.

FIG. 2 is a block diagram illustrating a representative PTT service transaction in accordance with the principles of the present invention. In the illustrated embodiment, a PTT client 200 would like to utilize a service provided by the PTT application server 202. Assume for purposes of this example that the service desired by the user of the PTT client 200 is statistical information, such as the current scores and other game status in a multi-player game played via the PTT platform. The PTT client 200 sends a service request including a command to the PTT system via the mobile network 204, ultimately arriving at the PTT server 206 as illustrated by command path A. The service request/command is generated by the PTT client 200. The command may be directly entered by user via the PTT client 200, or in a preferred embodiment is generated upon user selection of the appropriate service request via a User Interface (UI) of the mobile device associated with the PTT client 200. For example, the user may select a graphical and/or textual icon labeled "game status" available via the mobile device/PTT client 200.

Upon receiving the service request, the PTT server 206 delivers the service request to the PTT application server 202 as illustrated by delivery path B. The particular application at the PTT application server 202 executes the command provided via the service request. For example, where the command is get-game-status, the PTT application server 202 can retrieve stored information relating to the game from a database 208 or other memory/storage. Upon retrieving the requested information, the PTT application server 202, acting as a client with respect to the PTT server 206, returns a message with the result to the PTT server 206 as shown by return path C. Upon receiving the message, the PTT server 206 forwards the message back to the mobile PTT client 200 as shown by return path $D_1$. In some cases, the return message may be directed to multiple or all of the PTT clients associated with the PTT group, as depicted by the additional return path(s) $D_N$ to the PTT client 210.

It should be noted that the PTT application server 202 can provide any one or more of a number of different types of services. As another example, consider a voicemail service, and assume that PTT client 200 is involved in a long-lasting game requiring such voicemail capability. The PTT application server 202 can provide such a service to the participants of the game. A voicemail initiated by PTT client 200 can be stored via the PTT application server 202, and retrieved by any of the other users in the talk group (e.g., PTT clients 210, etc.). To retrieve a voicemail, PTT client 210 can use various message protocols to deliver the command to the PTT server 206. For example, the command may be delivered via a Hypertext Transfer Protocol (HTTP), Simple Object Access Protocol (SOAP) message. In such an example, the PTT client 210 serves as the SOAP originator, the PTT application server 202 serves as the SOAP ultimate destination, and the PTT server 206 serves as a SOAP intermediary. As is known in the art, SOAP provides a message framework which defines the message structure and processing mechanism, a set of encoding rules to represent service-specific data types, and a convention to enable remote procedure calls or the exchange of messages. SOAP defines a uniform manner of passing XML-encoded data, as well as defines a manner to perform Remote Procedure Calls (RPCs) using HTTP as the underlying communication protocol. Thus, in the illustrated example, XML-encoded data (including the PTT service command) may be passed from the PTT client 210 to the PTT server 206, and ultimately to the PTT application server 202 via a SOAP message using HTTP as the underlying communication protocol.

Another representative message protocol that may be used by a PTT client 210 to access a PTT application server 202 service is SIP. SIP is a signaling protocol that can be used for creating, modifying, and terminating "sessions" with one or more participants. It can be used in applications such as Internet conferencing, telephony, presence, events notification, instant messaging, and the like. SIP enables network endpoints or "user agents" to discover one another and to agree on a session characterization. In order to locate other users, SIP utilizes an infrastructure of network proxy servers to which users can send registrations, invitations to sessions, and other requests via their terminals. SIP supports various aspects of establishing and terminating sessions, such as user availability, session setup such as ringing, session management, and some limited terminal capabilities. In one embodiment, the PTT client 210 service requests may be transferred via such SIP sessions (or analogous messaging sessions).

SIP also enables messaging outside of sessions using, for example, SIP extensions for Instant Messaging (IM), where the message is sent using a SIP signaling protocol. For example, one SIP method is referred to as a "MESSAGE," which traditionally provides for the transport of an instant message body. A SIP MESSAGE can be sent, which includes the payload of the message, and the sender receives a confirmation as to whether the message was delivered or not. In such a case, there is no explicit association between messages, and each message stands on its own. This is contrasted with session-based messaging, where there is an explicit conversation with a beginning and an end. One embodiment of the invention involves PTT clients issuing service requests by way of such non-session-based messaging.

PTT clients may also utilize other session protocols to the PTT application server 202, such as RTP, Transmission Control Protocol (TCP), and User Datagram Protocol (UDP) sessions. It is noted that the aforementioned messaging examples are provided as representative examples, and the invention is not limited thereto. Other messaging protocols may analogously be used.

Figure 3:
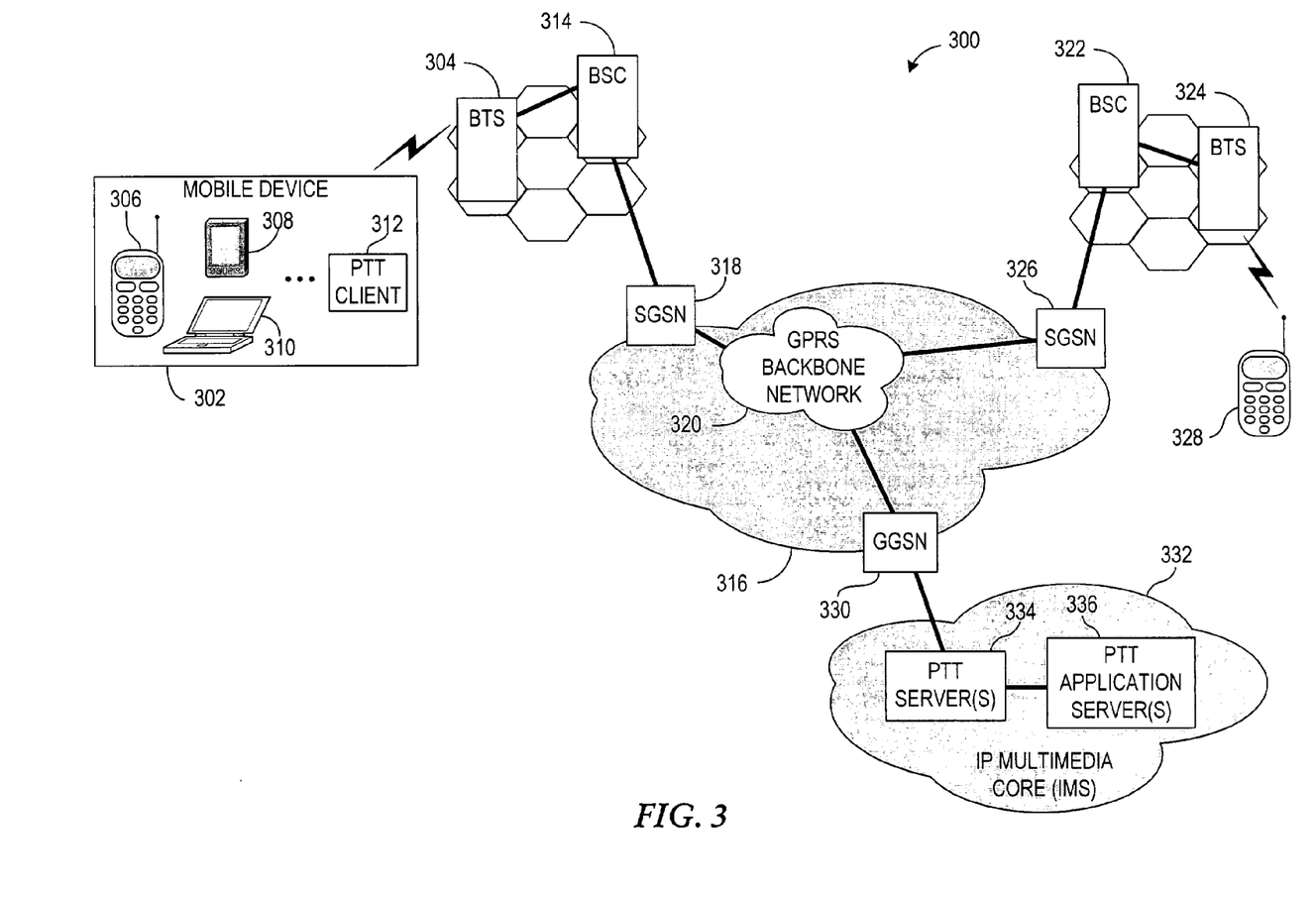
FIG. 3 is a diagram illustrating a representative embodiment of a network-level implementation of a PTT-based service in accordance with the present invention.

FIG. 3 is a diagram illustrating a representative embodiment of a network-level implementation of a PTT-based service in accordance with the present invention. As previously indicated, PTT systems may be operated over mobile networks such as the cellular network 300 shown in FIG. 3. PTT systems operating over such cellular networks are often referred to as Push to Talk over Cellular (PoC). PTT clients communicate with the operator network which provides the infrastructure in which the communications may be effected.

The PTT embodiment described herein is applicable in any number of network systems. For purposes of illustration and not of limitation, FIG. 3 is described in the context of a General Packet Radio System (GPRS) mobile communications network. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiment of FIG. 3 is generally described in connection with GPRS, and GSM which is the underlying digital technology of GPRS, it should be recognized that the specific references to GSM and GPRS are provided to facilitate an understanding of the invention. As will be readily apparent to those skilled in the art from the description provided herein, the invention is equally applicable to other technologies, including other packet-switched circuit-switched technologies, 3G technologies, and beyond.

Referring to the example of FIG. 3, the mobile device 302 communicates with a base transceiver station (BTS) 304 via an air interface. The mobile device may include mobile phones 306, PDAs 308, portable wireless laptop/notebook computers 310, or any other device in which a PTT client 312 may be implemented. As is known in the art, the BTS 304 is a component of the wireless network access infrastructure that terminates the air interface over which subscriber traffic is communicated to and from the mobile device 302. The Base Station Controller (BSC) 314 is a switching module that provides, among other things, handoff functions, and controls power levels in each BTS 304. The BSC 314 controls the interface between a Mobile Switching Center (MSC) (not shown) and BTS 304 in a GSM wireless network 316, and thus controls one or more BTSs in the call set-up functions, signaling, and in the use of radio channels. The BSC 314 also controls the interface between the Serving GPRS Support Node (SGSN) 318 and the BTS 304 in a GPRS network 320.

The Serving GPRS Support Node (SGSN) 318 serves GPRS mobile by sending or receiving packets via a Base Station Subsystem (BSS), and more particularly via the BSC 314 in the context of GSM systems. The SGSN 318 is responsible for the delivery of data packets to and from the mobile devices 302 within its service area, and performs packet routing and transfer, mobility management, logical link management, authentication, charging functions, etc. In the exemplary GPRS embodiment shown in FIG. 3, the location register of the SGSN 318 stores location information such as the current cell and Visiting Location Register (VLR) associated with the mobile device 302, as well as user profiles such as the International Mobile Subscriber Identity Number (IMSI) of all GPRS users registered with this SGSN 318.

Other BSCs 322 and corresponding BTSs 324 are integrated into the network 316 by way of other SGSNs 326. Mobile devices 328 communicate with the BTSs 324 in this service area. Mobile devices 302, 328 can thus communicate with one another via the GSM/GPRS network 316, 320. While GSM forms the underlying technology, the SGSNs 318, 326 described above are network elements introduced through GPRS technology. Another network element introduced in the GPRS context is the Gateway GPRS Support Node (GGSN) 330, which acts as a gateway between the GPRS network 320 and a packet switched data network, such as IP Multimedia Core 332 (IP multimedia subsystems (IMS) network in the illustrated embodiment). This gateway 330 allows mobile subscribers to access the data network 332 or specified private IP networks. The connection between the GGSN 330 and the data network 332 is generally enabled through a standard protocol, such as the Internet Protocol (IP).

The PTT server 334 and PTT application server 336 of the illustrated embodiment are provided at the IP multimedia core 332. Thus, mobile devices 302, 328 can communicate with each other over the network using standard half-duplex talk spurts. A mobile device, such as mobile device 302, may opt to invoke a service available via the PTT application server 336, which is then effected as described in connection with FIGS. 1 and 2.

Figure 4:
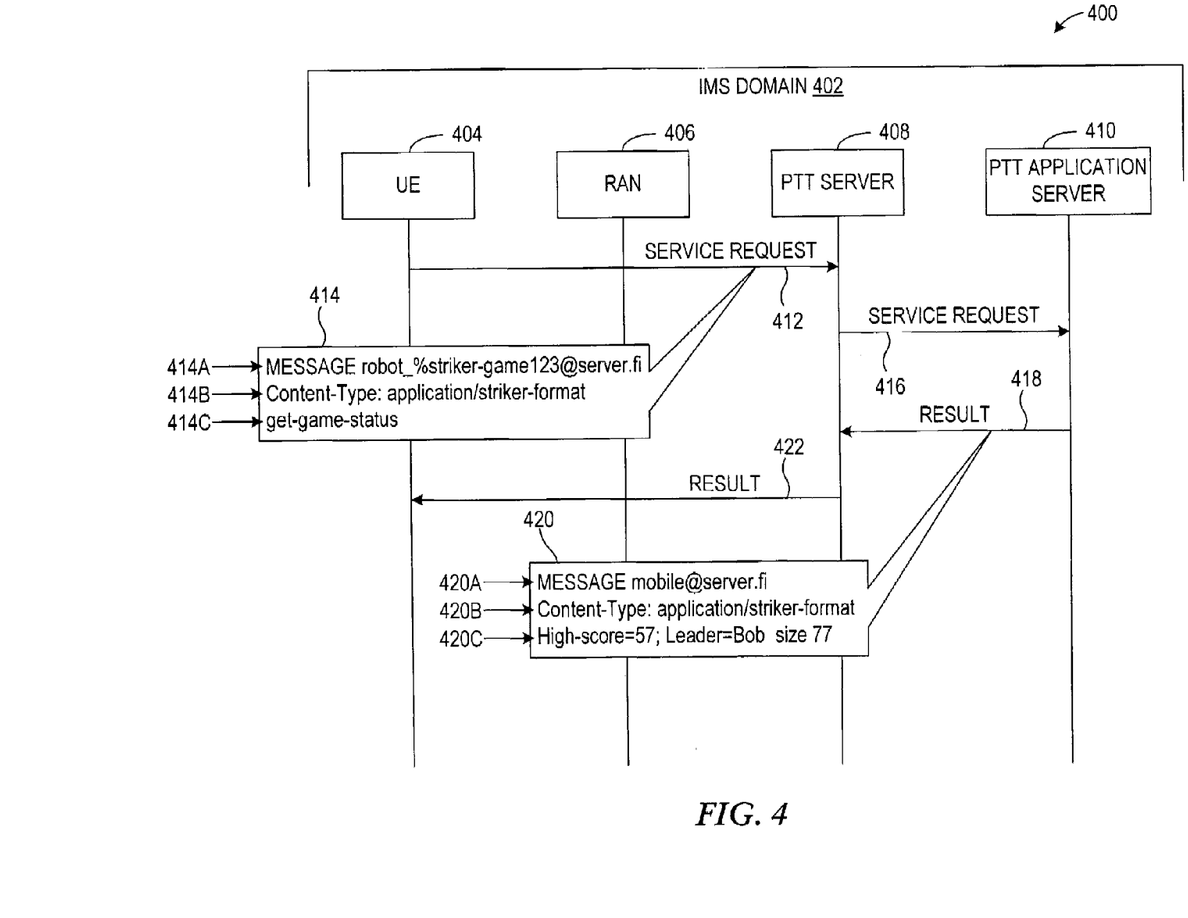
FIG. 4 illustrates a representative message flow for PTT service requests in accordance with one embodiment of the present invention.

FIG. 4 illustrates a representative message flow 400 for PTT service requests in accordance with one embodiment of the present invention. The messaging flow 400 describes a representative example of how a PTT client can request and receive services. The example is described in terms of an IMS network, and illustrates a number of networks/network elements that are part of the IMS domain 402 including User Equipment (UE) terminal 404 (i.e., PTT client), a Radio Access Network (RAN) 406, a PTT server 408, and a PTT application server 410. The UE 202 represents a device(s) that may include a PTT client that is desirous of obtaining a service(s) from the PTT application server 410. The RAN 406 of the illustrated embodiment represents a third generation (3G) network that provides mobile access to a number of core networks of both mobile and fixed origin—it is the network that bridges the radio link and the IP core network.

For purposes of illustration, the message flow of FIG. 4 is described in terms of SIP messaging. A SIP MESSAGE is issued from the UE 404 to provide the service request to the PTT server 408, as shown on path 412. The MESSAGE method transports the message body to the destination Uniform Resource Identifier (URI) within or outside an established session, and a SIP MESSAGE may be sent at any time. An exemplary service request is shown at block 414. In the illustrated embodiment, the MESSAGE method 414A includes a URI of "robot_%striker-game123@server.fi," and the content type 414B is "application/striker-format." The command 414C, "get-game-status," is provided as the message body. The service request is forwarded by the PTT server 408 to the PTT application server 410 as shown on path 416, and is executed by the application identified in the URI at the PTT application server 410 also identified in the URI.

The PTT application server 410 thus executes the "get-game-status" command to obtain a game status result. This result is provided by the PTT application server 410 to the PTT server 408 as shown on path 418. In the illustrated embodiment, the format of the result is analogous to the format of the service request. More particularly, the result shown at block 420 includes a MESSAGE method 420A that includes the URI "mobile@server.fi," which identifies the UE 404. The content type 420B is again "application/striker-format." The resulting data 420C, "High-score=57; Leader=Bob size 77" provides the game status requested by the UE 404. This message/result is then provided by the PTT server 408 to the UE 404 as shown on path 422.

The PTT application server 410 can provide any number of different services. For purposes of example and not of limitation, such services may include voicemail, text message retrieval, chat history retrieval, game status retrieval, automatic voice conversion, and the like. Before a PTT client can access voicemail from a voicemail service provided by the PTT application server 410, other clients will provide a voice message to the PTT application server 410. This can be done in various ways. For example, the PTT application server 410 may be integrated with a standard voicemail system using, for example, standard two-way cellular or PSTN service. The PTT application server 410 would obtain the voicemail from a standard cell network voicemail system, and the PTT application server may either send a SIP MESSAGE, SIP NOTIFY, or other analogous message indicating that voicemail has arrived for a particular PTT client. Alternatively, the PTT application server 410 may simply initiate a one-to-one speech session and play the voicemail. Another example involves the user 404 initiating a one-to-one speech session to the URI hosted at the PTT application server 410. For example, "user sip: ptt_service@server.fi" may be present in every PTT session, and anybody can initiate the one-to-one speech session to that address. The initiation may be accomplished using signaling (e.g., RTP, SIP, or the like, depending on the PTT version) where the user includes the intended recipient of the voicemail message to the signaling (e.g., via a header).

Statistical services such as chat history retrieval, game status retrieval, and the like involves collection of such statistics by the PTT application server 410. For example, in a game situation, the PTT application server 410 appears as a member of the gaming group, and stores relevant game statistics for subsequent retrieval by the gaming members. Still other services, such as a voice conversion service, may be provided to add enjoyment to the game. Such a service may, for example, use a text-to-speech (or speech-to-speech) converter using a celebrity voice, animated voice, etc. The resulting voice can then be sent to the intended recipients in real-time talk spurts, or alternatively stored as voicemail if the PTT application server also supports voicemail. Any number of different services is conceivable.

There are also various manners in which the PTT server 408 can be informed that a particular PTT client service request is to be forwarded to the PTT application server 410. For example, user-specific names may be used, such as "robot" to identify the PTT application server 410. The SIP MESSAGE URI 414A illustrates such an example. Alternatively, URI parameters may be selected so the PTT server 408 knows that the particular request is to be forwarded to the PTT application server 410. For example, the SIP URI may include, for example, an entry such as "user=poc-admin" to represent the PTT application server 410 as a "user" identified as a PTT over Cellular (Poc) administrator. Any other operable manner may also be used. Furthermore, rather than using SIP messaging, HTTP SOAP or other messaging protocols may analogously be used.

Figure 5A:
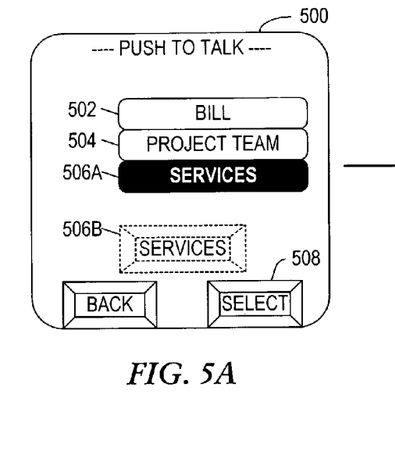
FIGS. 5A and 5B illustrate an example of a PTT client user interface (UI) that may be used to identify and select services in accordance with the present invention.
Figure 5B:
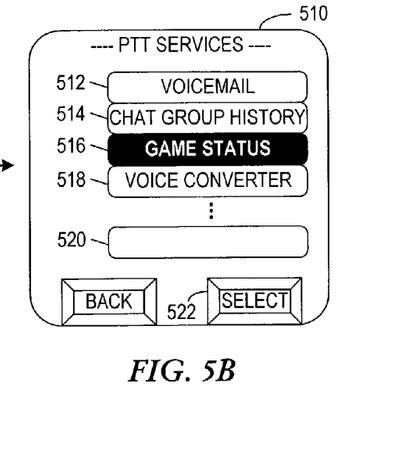

FIGS. 5A and 5B illustrate an example of a PTT client user interface (UI) that may be used to identify and select services in accordance with the present invention. While the exemplary embodiment of FIGS. 5A and 5B are described in connection with a UI presenting selectable labels, the present invention is equally applicable to user selection via physical buttons, switches, joysticks, levers, trackballs or wheel rollers, voice-activated input, text entry, touch screens, or any other user input system or mechanism that allows the user to select the desired PTT services.

As shown in FIG. 5A, the representative screen 500 may be presented to a user of a PTT client, such as a mobile device. Such a screen 500 may be presented in response to the user previously selecting (or being automatically presented with) an option to utilize the Push to Talk features of the mobile device. The user may be presented with various predefined individuals and/or talk groups, or the user may create them. For example, the user's selectable options in FIG. 5A include an individual 502 ("Bill") and a talk group 504 ("Project Team"). In the typical PTT mode, the user would select a recipient such as the individual 502 "Bill." At that point, the user can simply press a button to engage in real-time, half-duplex communication with "Bill."

In accordance with the present invention, other selectable options may be presented to the user on any mobile device screen available to the user. In the illustrated embodiment, the "Services" option is presented with the selectable recipient list 502, 504. The selectable option may be presented in any fashion, such as together with the recipient list as shown by the "Services" entry 506A, by way of a selectable "Services" icon 506B, or the like. For example, the user can highlight the "Services" entry 506A and choose the "Select" icon 508, or can make a direct selection in the case of a "Services" button 506B. Upon selecting "Services," the PTT client presents a PTT Services screen 510. Any number of available services can be presented to the user by way of such a screen. In the illustrated embodiment, the selectable services include voicemail 512, chat group history 514, game status 516, voice converter 518, and/or other services 520. For example, if the user highlights the game status 516 and chooses the "Select" button 522, the PTT client will generate a service request destined for the appropriate PTT application server to retrieve the desired game status.

Figure 6:
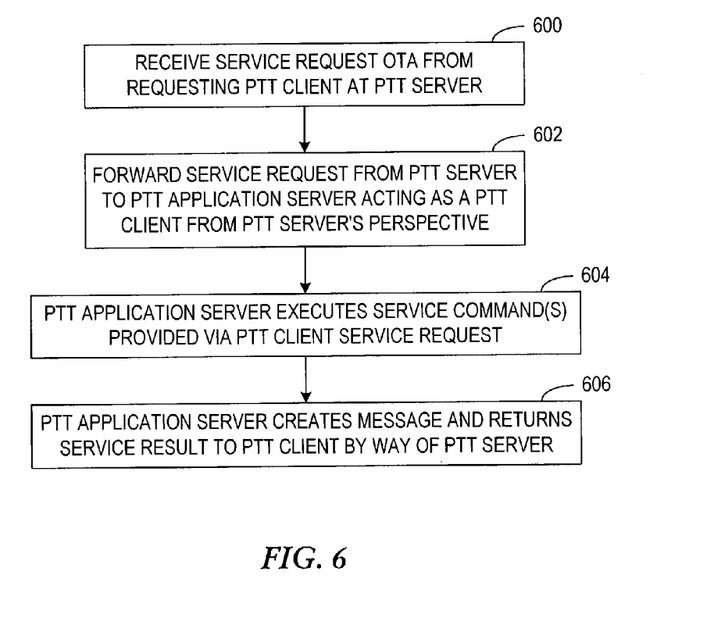
FIG. 6 is a flow diagram illustrating one embodiment of a method for providing services by way of the PTT platform in accordance with the invention.

In this manner, PTT clients can not only perform their traditional half-duplex communication with other PTT clients, they can also request the performance of services via the PTT platform. FIG. 6 is a flow diagram illustrating one embodiment of a method for providing such services by way of the PTT platform. A service request is received 600 over-the-air (OTA) from a requesting PTT client at a PTT server. The service request is forwarded 602 from the PTT server to a PTT application server acting as a PTT client from the PTT server's perspective. The PTT application server then executes 604 service commands provided via the PTT client service request.

In some cases, the service may simply execute the command and perform related internal operations. For example, a service request may request that information be stored at the PTT application server. In such a case, the service request causes the PTT application server to store the desired information, and no information is returned. Examples of such service requests include storing a voicemail, game data, etc. A service request may also request that information be returned to the PTT client, such as retrieving a voicemail, game status, etc. In such case, the PTT application server generates the appropriate message with the requested data, and forwards the message to the PTT server which in turn forwards the message to the requesting PTT client, as shown at block 606.

Figure 7:
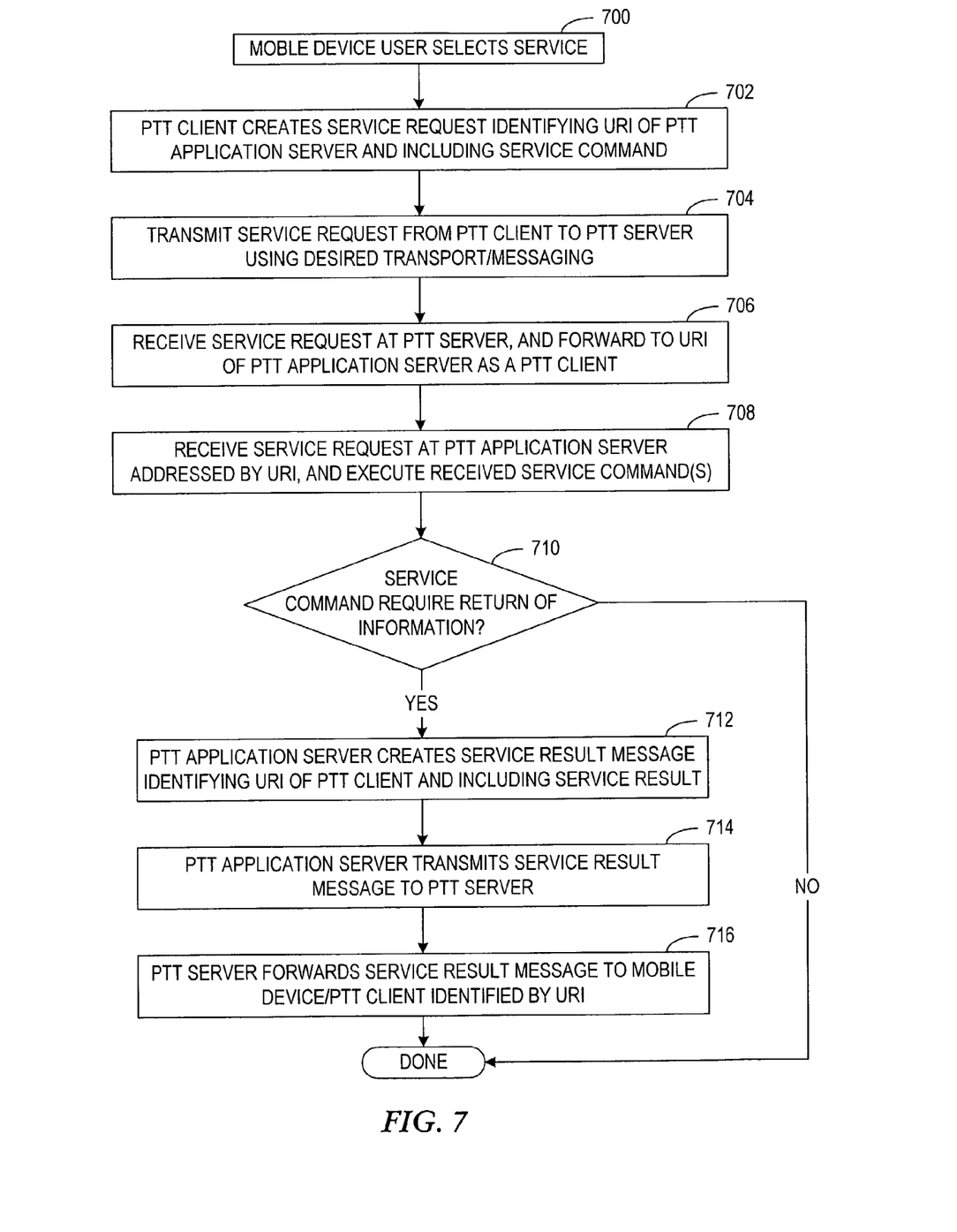
FIG. 7 is a flow diagram illustrating a more particular embodiment of a method for providing services to mobile PTT clients in accordance with the present invention.

FIG. 7 is a flow diagram illustrating a more particular embodiment of a method for providing services to mobile PTT clients in accordance with the present invention. In the illustrated embodiment, the mobile device user selects 700 a service by using any desired UI methodology. The PTT client at the mobile device creates 702 a service request identifying an address (e.g., Uniform Resource Identifier; URI) of the PTT application server, where the service request includes a service command to identify the particular service desired. The service request is transmitted 704 from the PTT client to the PTT server using a desired transport/messaging protocol, such as HTTP SOAP, SIP MESSAGE, SIP NOTIFY, etc. The service request is received 706 at the PTT server, which in turn forwards the service request to the URI of the PTT application server (provided via the service request). Again, the PTT application server operates as a client with respect to the PTT server. The service request is received 708 at the PTT application server addressed by the URI provided in the service request. Alternatively, the URI may be hardcoded at the PTT server, such that service requests are automatically routed to the appropriate PTT application server. Upon receipt of the service request, the PTT application server executes the service command provided therewith.

If the service command is one that does not require the return of information to the requesting PTT client as determined at decision block 710, the service transaction is complete upon execution of the command by the PTT application server. Otherwise, the PTT application server creates 712 a service result message identifying the URI of the PTT client, and includes the result in the message. The message is transmitted 714 from the PTT application server to the PTT server, which in turn forwards 716 the result message to the mobile device/PTT client identified by the URI.

Figure 8:
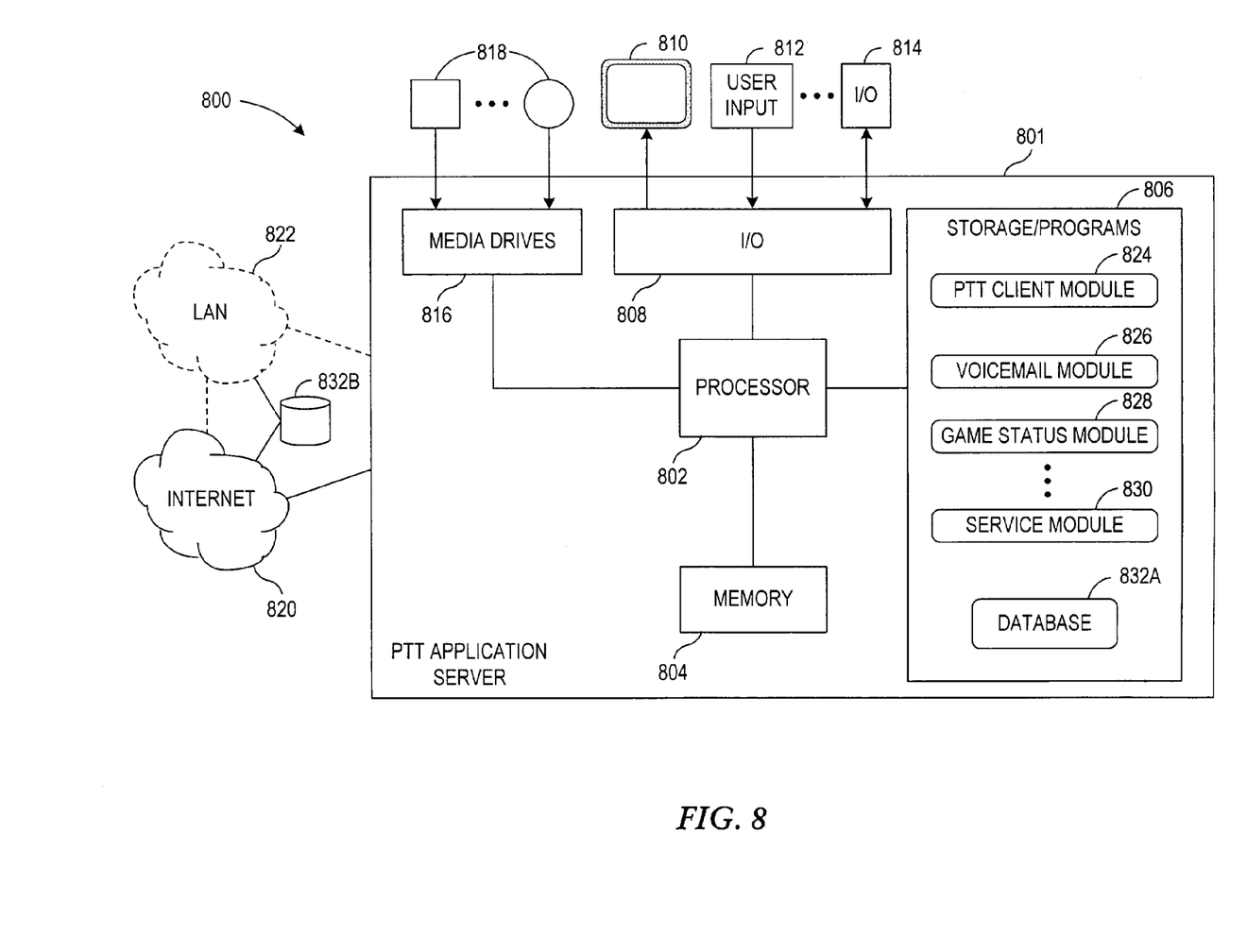
FIG. 8 is a block diagram of a representative computing implementation of a PTT application server capable of carrying out operations in accordance with the invention.

As previously indicated, the PTT application server coupled to the PTT application server via a network. In other embodiments, the PTT application server may be co-located with the PTT server, yet the PTT application server still appears as a PTT client to the PTT server. At the PTT application server, hardware, firmware, software or a combination thereof may be used to perform the various application service functions and operations described herein. An example of a representative computing implementation of a PTT application server capable of carrying out operations in accordance with the invention is illustrated in FIG. 8.

The example computing arrangement 800 suitable for performing the service functions of the PTT application server 801 includes a central processor 802, which may be coupled to memory 804 and storage 806. The processor 802 carries out a variety of standard computing functions as is known in the art, as dictated by software and/or firmware instructions. The storage 806 may represent firmware, hard-drive storage, etc. The storage 806 may also represent other types of storage media to store programs, such as programmable ROM (PROM), erasable PROM (EPROM), etc. The processor 802 may communicate with other internal and external components through input/output (I/O) circuitry 808. The PTT application server 801 may therefore be coupled to a display 810, which may be any type of known display or presentation screen such as LCD displays, plasma display, cathode ray tubes (CRT), etc. A user input interface 812 is provided, including one or more user interface mechanisms such as a mouse, keyboard, microphone, touch pad, touch screen, voice-recognition system, etc. Any other I/O devices 814 may be coupled to the PTT application server as well.

The PTT application server 801 may also include one or more media drive devices 816, including hard and floppy disk drives, CD-ROM drives, DVD drives, and other hardware capable of reading and/or storing information. In one embodiment, software for carrying out the PTT application service operations in accordance with the present invention may be stored and distributed on CD-ROM, diskette or other form of media capable of portably storing information, as represented by media devices 818. These storage media may be inserted into, and read by, the media drive devices 816. Such software may also be transmitted to the PTT application server 801 via data signals, such as being downloaded electronically via a network, such as the Internet 820. The PTT application server 801 may be coupled to other computing devices, such as the landline and/or mobile terminals, via a network. The server may be, for example, coupled to a Local Area Network (LAN) 822 and/or may be part of a larger network configuration as in a global area network (GAN) such as the Internet 820, which allows ultimate connection to the various landline and/or mobile client devices.

In accordance with one embodiment of the invention, the storage 806, memory 804, and/or media devices 818 store the various programs and data used in connection with the present invention. In the illustrated embodiment of FIG. 8, the storage 806 is shown storing the various program modules, operable in connection with the processor 802. For example, the PTT client module 824 provides the functionality for communicating as a PTT client with the PTT server. Any number of service modules may be provided via the PTT application server 801 as previously described. In the illustrated embodiment, a plurality of such service modules are provided, including a voicemail module 826, game status module 828, and other service modules 830. A database 832A may also be provided at the storage module 806, to store service-related information such as voicemails, game statistics, chat history, and the like. Such a database 832A may instead (or in addition) be maintained elsewhere, such as on the network as illustrated by database 832B. It should be recognized that these programs and data may be stored in memory 804, on other media 818, or accessible via one or more networks 820, 822 rather than being stored in the storage 806. The particular storage location is not relevant to the present invention.

The computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile and landline computing environments. Thus, the present invention is applicable in any known computing structure where data may be communicated via a network.

Figure 9:
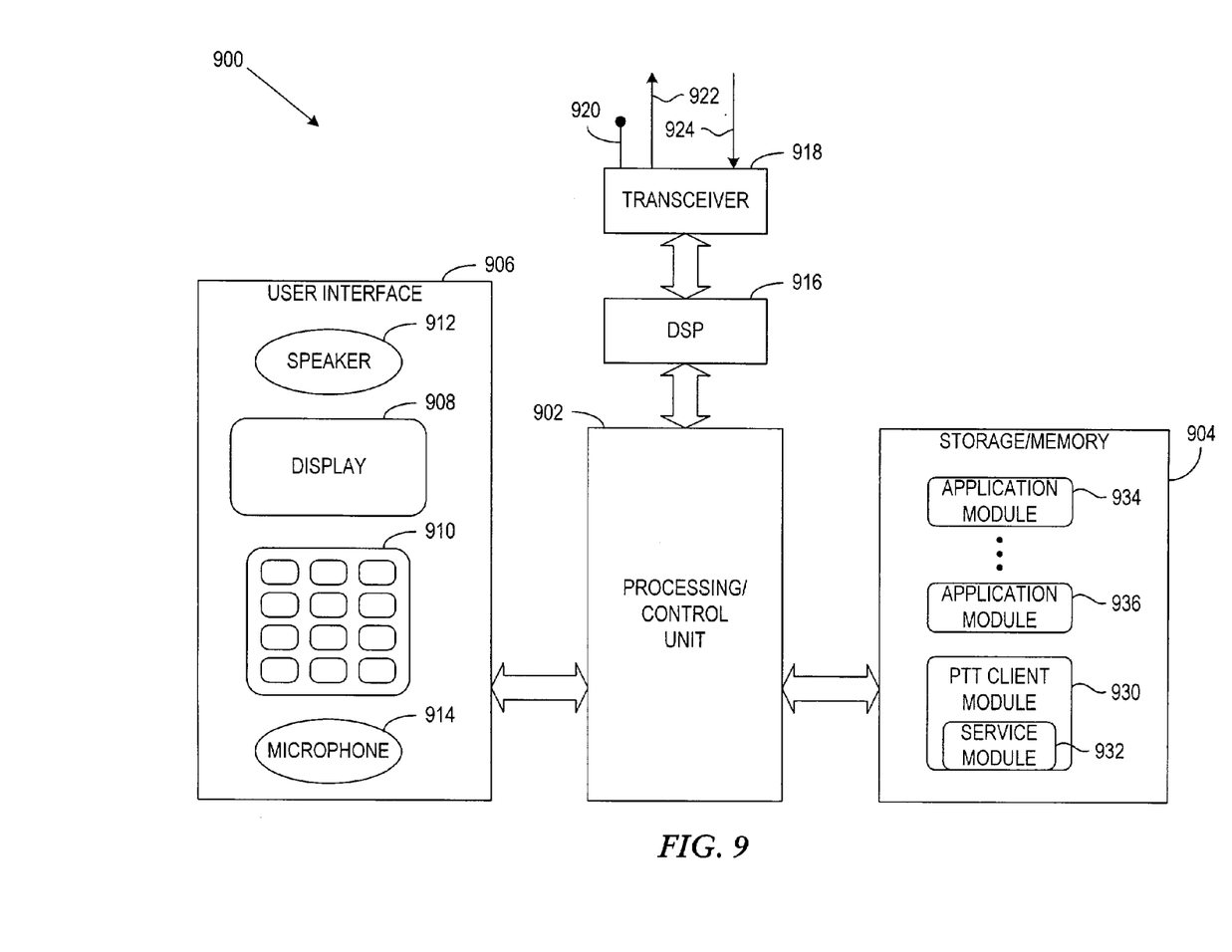
FIG. 9 is a block diagram of a representative PTT-enabled mobile device capable of engaging in PTT service-related functions over mobile networks in accordance with the present invention.

The service-requesting devices in one embodiment of the invention are PTT-enabled mobile devices, such as mobile phones, PDAs, and other mobile communicators. A representative example of such a PTT-enabled mobile device which is capable of engaging in PTT service-related functions over mobile networks in accordance with the present invention is illustrated in FIG. 9. The mobile device 900 utilizes computing systems to control and manage the conventional device activity as well as the functionality provided by the present invention. Hardware, firmware, software or a combination thereof may be used to perform the functions and operations described herein. The representative mobile device 900 includes a computing system capable of carrying out operations in accordance with the invention. For example, the representative mobile device 900 includes a processing/control unit 902, such as a microprocessor, reduced instruction set computer (RISC), or other central processing module. The processing unit 902 need not be a single device, and may include one or more processors. For example, the processing unit may include a master processor and associated slave processors coupled to communicate with the master processor.

The processing unit 902 controls the basic functions of the mobile device 900 as dictated by programs available in the program storage/memory 904. The storage/memory 904 may include an operating system and various program and data modules associated with the present invention. In one embodiment of the invention, the programs are is stored in non-volatile electrically-erasable, programmable read-only memory (EEPROM), flash ROM, etc., so that the programs are not lost upon power down of the mobile device. The storage 904 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 900 via data signals, such as being downloaded electronically via one or more networks, such as the Internet and an intermediate wireless network(s).

For performing other standard mobile device functions, the processor 902 is also coupled to user-interface 906 associated with the mobile device 900. The user-interface (UI) 906 may include, for example, a display 908 such as a liquid crystal display, a keypad 910, speaker 912, and microphone 914. These and other UI components are coupled to the processor 902 as is known in the art. The keypad 910 may include alpha-numeric keys for performing a variety of functions, including dialing numbers for conventional cellular communication. The keypad 910 may also include a button(s) designated for PTT activity, i.e., the "talk" button. The speaker 912 represents at least a loudspeaker used for PTT activity, and also the speaker that may be used in connection with standard cellular communications. The display 908 may display, among other things, the text, graphics, icons, etc., that may be used by the user in entering/selecting PTT individual and group recipients, as well as entering/selecting the desired services in accordance with the present invention. Other UI mechanisms may be employed, such as voice commands, switches, touch pad/screen, graphical user interface using a pointing device, trackball, joystick, or any other user interface mechanism.

The wireless device 900 also includes conventional circuitry for performing wireless transmissions over the mobile network. The DSP 916 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 918, generally coupled to an antenna 920, transmits the outgoing radio signals 922 and receives the incoming radio signals 924 associated with the mobile device 900.

In the illustrated embodiment, the storage/memory 904 stores the various PTT client programs and data used in connection with the present invention. For example, the storage 904 includes the PTT client module 930 to perform PTT communications with the PTT server. A service module 932, part of the PTT client module 932 in the illustrated embodiment, may be used to create and transmit messages to provide service requests to the PTT application server by way of the PTT server. Alternatively, the application modules 934 through 936 may themselves include the appropriate instructions for such message generation.

The application modules 934 through 936 represent software modules to engage in activities such as games. For example, application module 934 may represent software for participating in a particular game with other PTT clients. The application may be such that supporting information such as high scores, player chat, voicemail, and/or other information is desirable in connection with such a game. In these cases, the application modules 934, 936 and/or the service module 932 can be used to request such services via the PTT client module 930.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, a mobile device/PTT client may also serve as the PTT application server if properly equipped with the service applications. It is intended that the scope of the invention be limited not with this detailed description, but rather defined by the claims appended hereto.

What is claimed is:

1. A method for introducing services into a Push to Talk (PTT) environment, comprising:
configuring a PTT application server to function as a client for purposes of receiving PTT service requests;
generating and transmitting a request for at least one service via a requesting PTT client;
receiving the request at a PTT server, and forwarding the request from the PTT server to the PTT application server recognized by the PTT server as another PTT client;
performing the requested service at the PTT application server and generating a result in response thereto; and transmitting the result from the PTT application server to the requesting PTT client by way of the PTT server.

2. The method of claim 1, wherein generating a request comprises formulating a request message including at least a Uniform Resource Identifier (URI) of the PTT application server and a service command.

3. The method of claim 2, wherein the request message further includes a content type.

4. The method of claim 2, wherein formulating a request message comprises formulating a SOAP message embodied in an HTTP transport packet.

5. The method of claim 2, wherein formulating a request message comprises formulating a SIP request message.

6. The method of claim 5, wherein formulating a SIP request message comprises formulating the SIP request messaging using at least one of a SIP MESSAGE method or a SIP NOTIFY method.

7. The method of claim 2, further comprising establishing a session between the requesting PTT client and the PTT application server, and wherein transmitting the request comprises transmitting the request by way of the established session.

8. The method of claim 7, wherein establishing a session comprises establishing any of an RTP, TCP, UDP, or SIP session.

9. The method of claim 1, further comprising storing data relating to one or more of the services at the PTT application server, for use by the PTT application server in performing the requested service and generating the result.

10. The method of claim 9, wherein storing data relating to one or more of the services comprises:
generating and transmitting a storage request and associated data via a PTT client;
receiving the storage request at the PTT server, and forwarding the storage request from the PTT server to the PTT application; and
executing the storage request at the PTT application server.

11. The method of claim 10, wherein the storage request comprises at least one of a voicemail storage request and a text storage request.

12. The method of claim 9, wherein storing data relating to one or more of the services comprises recording the data as it is recognized at the PTT application server.

13. The method of claim 9, wherein storing data relating to one or more of the services comprises receiving the data via two-way cellular communication and storing the received data.

14. The method of claim 1, wherein transmitting the result from the PTT application server comprises formulating a response message including at least result data and a Uniform Resource Identifier (URI) of the requesting PTT client.

15. The method of claim 1, wherein transmitting the request comprises transmitting the request over-the-air via a mobile device associated with the requesting PTT client.

16. The method of claim 1, wherein forwarding the request from the PTT server to the PTT application server comprises forwarding the request in a manner corresponding that in which PTT voice communications are forwarded by the PTT server to PTT clients.

17. A method for providing services in a Push to Talk (PTT) system having a plurality of PTT clients capable of intercommunicating via at least one PTT server, the method comprising:
configuring a PTT application server to function as a client for purposes of receiving PTT service requests;
receiving an over-the-air service request from a requesting PTT client at the PTT server, wherein the service request includes at least one service command to identify a corresponding service feature;
forwarding the service request to the PTT application server that communicates with the PTT server as a PTT client; and
executing the service command at the PTT application server to perform the corresponding service feature requested by the requesting PTT client.

18. The method of claim 17, further comprising generating a service feature result in response to executing the service command, and returning the service feature result from the PTT application server to the PTT server for delivery to the requesting PTT client.

19. The method of claim 18, further comprising storing data relating to one or more of the services at the PTT application server for use by the PTT application server in generating the service feature result.

20. The method of claim 18, wherein returning a service feature result comprises creating a message, embedding the service feature result into the message, and transmitting the message from the PTT application server to the PTT server.

21. The method of claim 20, wherein creating a message comprises creating one of an HTTP/SOAP message, a SIP message, an RTP session, a TCP session, and a UDP session.

22. The method of claim 17, wherein the service comprises a voicemail service, and wherein the corresponding service feature comprises retrieving at least one stored voicemail.

23. The method of claim 17, wherein the service comprises a text message service, and wherein the corresponding service feature comprises retrieving at least one stored text message.

24. The method of claim 17, wherein the service comprises any one or more of a voicemail service, text message service, chat service, statistics gathering service, or a voice conversion service.

25. The method of claim 17, further comprising managing PTT communication between two or more of the PTT clients via the PTT server.

26. A server for providing services to push to talk (PTT) clients via an intermediary PTT server, the server comprising:
a processing system;
a database to store information targeted by service requests issued by the PTT clients;
a PTT client module operable via the processing system to conimunicate with the PTT server in a client-server relationship as a client for purposes of receiving PTT service requests; and
at least one service module operable via the processing system to process the service requests identifying the service module as a targeted service.

27. A system for providing services over a network via a Push to Talk over Cellular (PoC) platform, comprising:
at least one push to talk (PTT) client device having PTT capabilities and configured to generate and transmit at least one service request over-the-air (OTA);
a PTT server coupled OTA to the PTT client device to receive and redirect the service request to an addressed PTT client on the network; and
a PTT application server serving as the addressed PTT client and coupled to the network to receive the redirected service request, the PTT application server comprising a processing system to process the service request.

28. The system as in claim 27, wherein the service request includes at least a Uniform Resource Identifier (URI) identifying a network address of the PTT application server and one or more service commands identifying service functions to be processed.

29. The system as in claim 27, wherein the PTT server and PTT application server are co-located, while maintaining a client-server relationship.

30. The system as in claim 27, further comprising a database to store information targeted by the service requests, wherein the processing system of the PTT application server is further configured to access at least some of the information in connection with processing the service request.

31. The system as in claim 30, wherein the processing system of the PTT application server is further configured to generate a response message in response to processing the service request, and wherein the PTT application server comprises a transmitter to transmit the response message to the PTT client device by way of the PTT server.

32. The system as in claim 31, wherein the response message comprises a service processing result including at least some of the information stored in the database.

33. The system as in claim 27, wherein the PTT client device comprises a mobile device operable with the PTT server via a wireless network.

34. The system as in claim 33, wherein the mobile device comprises one of a mobile phone, a Personal Digital Assistant, and a portable computer.

35. The system as in claim 33, wherein the mobile device comprises a user interface to facilitate selection of a desired service by a user.

* * * * *